US006456663B1

United States Patent
Kim

(10) Patent No.: US 6,456,663 B1
(45) Date of Patent: Sep. 24, 2002

(54) DCT DOMAIN DOWN CONVERSION SYSTEM THAT COMPENSATES FOR IDCT MISMATCH

(75) Inventor: Hee-Yong Kim, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/537,346

(22) Filed: Mar. 29, 2000

(51) Int. Cl.[7] .................................................. H04N 7/30
(52) U.S. Cl. ........................ 375/240.25; 375/240.24; 375/240.21
(58) Field of Search ................... 375/240.25, 240.24, 375/240.21; H04N 7/30

(56) References Cited

U.S. PATENT DOCUMENTS

| 5,122,875 | A | 6/1992 | Raychaudhuri et al. .. | 348/390.1 |
| 5,590,139 | A | 12/1996 | Suzuki et al. ............... | 714/800 |
| 5,604,502 | A | 2/1997 | Haskell et al. .............. | 341/200 |
| 5,818,532 | A | 10/1998 | Malladi et al. ......... | 375/240.03 |
| 6,175,592 | B1 | * 1/2001 | Kim et al. ............. | 375/240.16 |
| 6,310,919 | B1 | * 10/2001 | Florencio ................ | 375/240.16 |
| 6,373,905 | B1 | * 4/2002 | Yasuda et al. ............... | 375/340 |
| 6,384,864 | B1 | * 5/2002 | Kim ............................ | 348/441 |

* cited by examiner

Primary Examiner—Howard Britton
(74) Attorney, Agent, or Firm—RatnerPrestia

(57) ABSTRACT

To reduce aliasing during the down conversion and decoding of video signals that have been encoded according to the moving picture experts group (MPEG) standard, a discrete cosine transform (DCT) domain filter is applied to the unquantized DCT coefficient values. Also, partly because the inverse discrete transform (IDCT) operation of the MPEG standard may be implemented, IDCT mismatch control processing is implemented. Concurrent implementation of the IDCT mismatch control process and the DCT domain filter does not consistently produce the highest quality picture. Thus, the current invention is related to a robust DCT domain filter designed to maintain the higher quality in downconverted images. The DCT domain filter sets the filter coefficient corresponding to the highest frequency band to unity to prevent modification of any coefficient value that has been modified by the IDCT mismatch operation.

13 Claims, 4 Drawing Sheets

DCT DOMAIN DOWN CONVERSION SYSTEM THAT COMPENSATES FOR IDCT MISMATCH

FIELD OF THE INVENTION

This invention relates to a decoder which converts and formats an encoded high resolution video signal, e.g., MPEG-2 encoded video signal, and more specifically to a method and apparatus for adaptively compensating for encoder/decoder mismatch.

BACKGROUND OF THE INVENTION

In the United States a standard has been proposed for digitally encoded high definition television signals (HDTV). A portion of this standard is essentially the same as the MPEG-2 standard, proposed by the Moving Picture Experts Group (MPEG) of the International Organization for Standardization (ISO). The standard is described in an International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard is actually several different standards. In MPEG-2, several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level, is intended for coding high-definition television images. Images encoded according to the Main Profile, High Level standard may have as many as 1,152 lines per image frame and 1,920 pixels per line.

The Main Profile, Main Level standard, on the other hand, defines a maximum picture size of 720 pixels per line and 576 lines per frame. At a frame rate of 30 frames per second, signals encoded according to this standard have a data rate of 720×576×30 or 12,441,600 pixels per second. By contrast, images encoded according to the Main Profile, High Level standard have a maximum data rate of 1,152× 1,920×30 or 66,355,200 pixels per second. This data rate is more than five times the data rate of image data encoded according to the Main Profile, Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field, and differing numbers of frames or fields per second. In addition, the basic syntax of the MPEG-2 Main Profile defines the compressed MPEG-2 bit stream representing a sequence of images in five layers, the sequence layer, the group of pictures layer, the picture layer, the slice layer and the macroblock layer. Each of these layers is introduced with control information. Finally, other control information, also known as side information, (e.g. frame type, macroblock pattern, image motion vectors, coefficient zig-zag patterns and dequantization information) is interspersed throughout the encoded bit stream.

Implementation of this standard in television studios and in viewer's homes is expected to be incremental. At least until the television studios provide a large amount of programming in HDTV format, viewers are likely to retain their standard definition television (SDTV) receivers but may want to view HDTV programming in SDTV format. Thus, the operation of decoding the encoded bitstream may include the process of down conversion. Down conversion converts a high definition input picture into a lower resolution picture for display on a lower resolution monitor. Down conversion of high resolution Main Profile, High Level pictures to Main Profile, Main Level pictures, or other lower resolution picture formats, has gained increased importance for reducing implementation costs of HDTV. Down conversion allows replacement of expensive high definition monitors used with Main Profile, High Level encoded pictures with inexpensive existing monitors that have a lower picture resolution to support, for example, Main Profile, Main Level encoded pictures, such as NTSC or PAL.

Processing of video signals in the MPEG-2 standard includes converting the video signals between the spatial domain and the frequency domain using discrete cosine transforms (DCTs) and inverse discrete cosine transforms (IDCTs) during the respective encoding and decoding stages of the process. When the DCT used by an encoder and the IDCT used by a decoder have different implementations, a difference may occur in the reconstructed pixels between the encoder and the decoder. This difference may accumulate and become visible in the decoded picture. This distortion is called IDCT mismatch distortion because the visible distortion in the decoded picture is caused by different DCT/IDCT implementations in the encoder and decoder. IDCT mismatch is a serious problem for high quality coding schemes such as those conforming to the MPEG-1 and MPEG-2 standards. Thus, in order to achieve high coding quality, IDCT mismatch must be controlled.

IDCT mismatch occurs when the result of an IDCT is very close to a half integer. A slight difference between the encoder and decoder can result in two different rounded integer values. This difference is most likely to cause problems when the values of the IDCT results are close to a half integer (e.g., 1.5). When the IDCT results are rounded to the nearest integer, one implementation may round up, because its resultant value is only slightly greater than the value of the half integer, while the other implementation rounds down, because its resultant value is only slightly less than the value of the half integer. Accordingly, if a decoder that rounds up processes a signal from an encoder that rounds down or vice versa, IDCT mismatch errors may occur. When a decoded frame containing errors is used to decode a sequence of predicted frames, the error may become more visible with each predicted frame that is based on the erroneous frame. One approach to control IDCT mismatch includes oddification methods. The processing of oddification typically involves setting specific coefficients to an odd value. In this approach, the reconstructed or dequantized DCT data is oddified at the decoder before the IDCT step.

SUMMARY OF THE INVENTION

The present invention provides an apparatus for use in a video decoder which decodes digital video signals that have been encoded into frequency domain coefficient values. The apparatus comprises a mismatch control processor, a frequency domain filter having filter coefficients corresponding to frequency bands, and an inverse frequency domain transform processor. The mismatch control processor is coupled to receive the frequency domain coefficient values and to process the frequency domain coefficient values according to a mismatch control algorithm to produce processed frequency domain coefficient values. The frequency domain filter is coupled to receive the processed frequency domain coefficient values and to provide lowpass filtered frequency domain coefficient values. If down conversion is performed, the frequency domain filter coefficient corresponding to the highest frequency band is set to 1 at least for image blocks tha have been modified by the mismatch control processor. The inverse frequency domain transform processor is coupled to the frequency domain filter for transforming the output coefficient values provided by the frequency domain filter into spatial domain picture elements.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Although illustrated and described above with reference to certain specific embodiments, the present invention is nevertheless not intended to be limited to the details shown. Rather, various modifications may be made in the details within the scope and range of equivalents of the claims and without departing from the invention.

Figure 1:
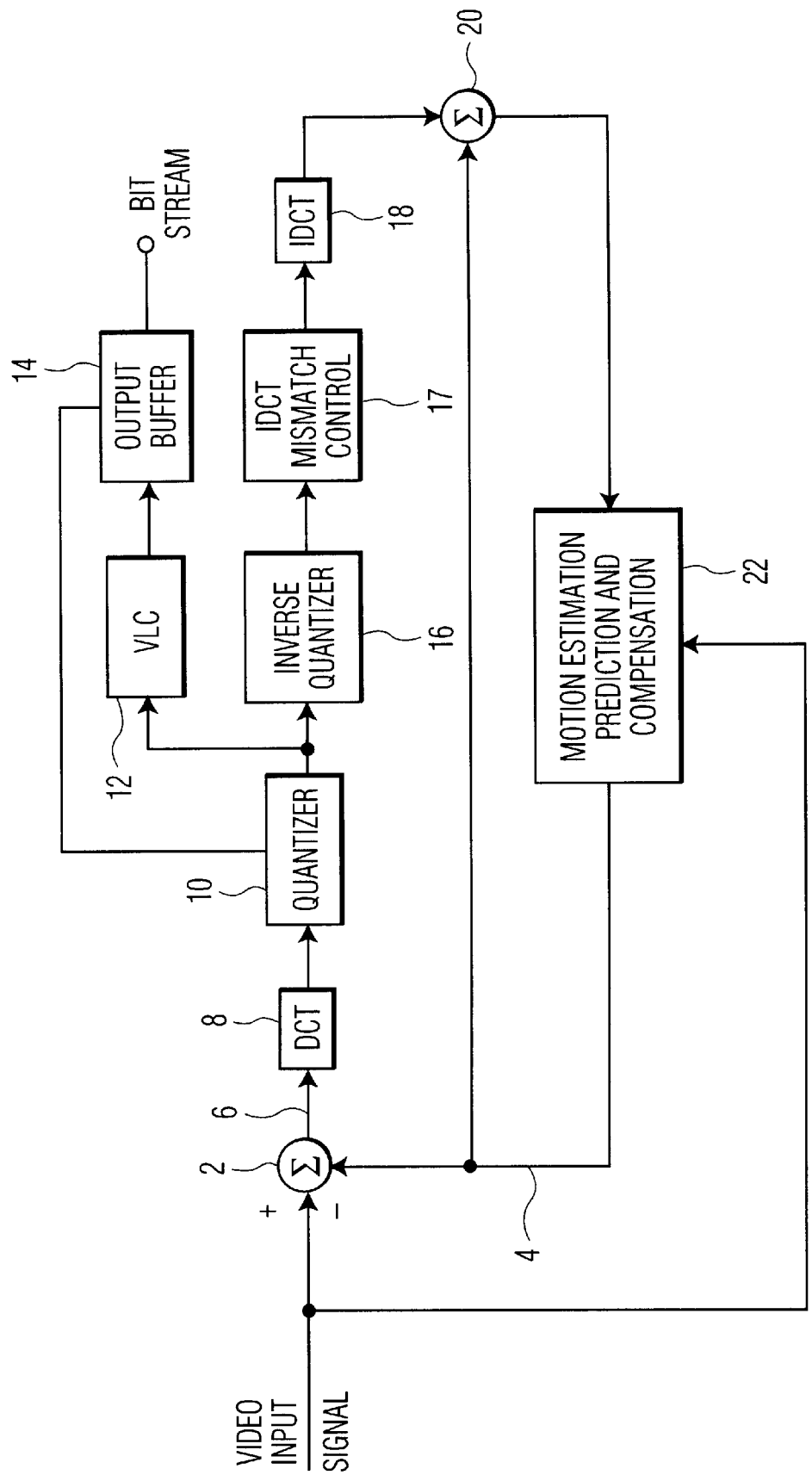
FIG. 1 (prior art) is a block diagram illustrating an exemplary configuration of a Moving Picture Experts Group (MPEG) encoding and compression system.

FIG. 1 is a block diagram illustrating an exemplary configuration of a Moving Picture Experts Group (MPEG) encoding and compression system.

The system shown in FIG. 1 compresses each picture of the video input signal, block-by-block, until all the blocks constituting the picture have been processed. A block may comprise a group of 8×8 pixels and a macroblock may comprise a group of 16×16 luminescence pixels and two to four 8×8 blocks of chrominance pixels. A current macroblock is fed into motion estimation block 22 to generate a motion estimation based on a previous reference picture. The summation circuit 2 is coupled to receive both the video input signal and the motion compensated prediction signal 4. The summation circuit 2, determines the pixel-by-pixel difference between the current video input signal picture block and its corresponding motion compensated prediction block 4. The resulting blocks of differences 6, are coupled to the discrete cosine transform (DCT) processor 8. The DCT processor 8, applies orthogonal transform processing to the difference blocks 6. The resulting blocks of frequency domain transform coefficients are provided to the quantizer 10. The quantizer 10 quantizes the blocks of transform coefficients to reduce the number of bits used to represent the transform coefficients. The variable-length coder 12 subjects the blocks of quantized transform coefficients from the quantizer 10 to variable-length coding, such as Huffmann coding and run-length coding. The resulting blocks of coded transform coefficients, along with motion vectors, are then fed as a bit stream, via the output buffer 14, to a digital transmission medium.

A control signal indicating the number of bits stored in the output buffer 14 is fed back to the quantizer 10. The quantizer 10 adjusts the quantizing step size in response to the control signal to prevent the output buffer 14 from overflowing or underflowing and also to maintain a required bit rate. Increasing or decreasing the quantizing step size respectively decreases or increases the number of bits fed into the output buffer 14.

The block of quantized transform coefficients provided by quantizer 10, is also coupled to the inverse quantizer 16. The inverse quantizer 16 performs processing complementary to the quantizing processing performed by the quantizer 10. The inverse quantized data is subjected to mismatch control 17, and the resulting block of transform coefficients is fed to the inverse discrete cosine transform (IDCT) processor 18, where it is inversely orthogonally transformed by processing complementary to the orthogonal transform processing performed by the discrete cosine transform processor 8.

The resulting restored spatial domain difference block is coupled to the summation circuit 20. The summation circuit 20 is also coupled to receive the motion compensated prediction block 4 for the current video input signal picture block from the motion estimation, prediction, and compensation circuit 22. The summation circuit 20 performs pixel-by-pixel addition between the restored difference block from the inverse discrete cosine transform circuit 18 and the matching motion compensated prediction block 4 from the motion estimation, prediction, and compensation circuit 22 to provide a reconstructed picture block to the motion estimation, prediction, and compensation circuit 22.

Figure 2:
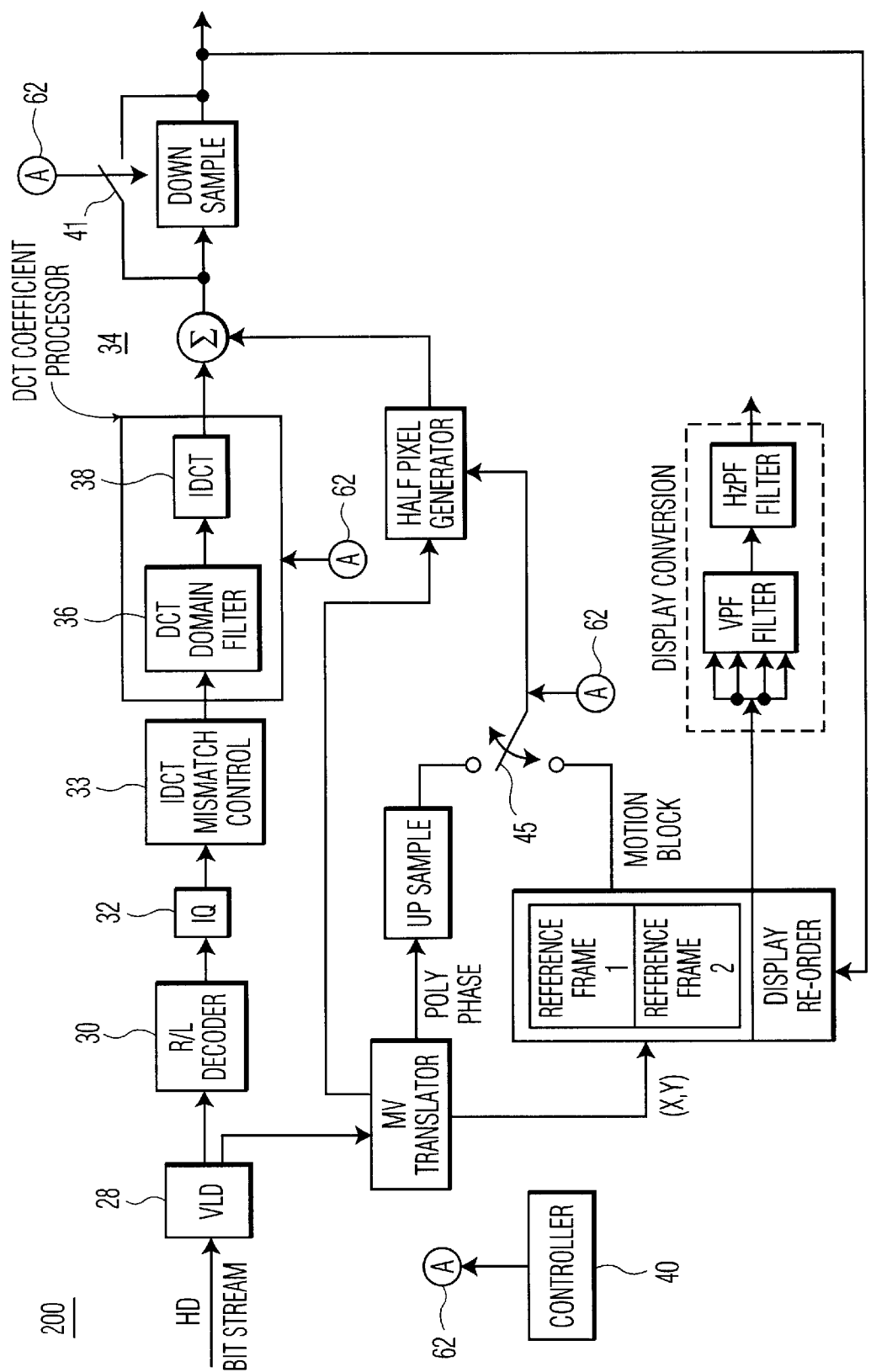
FIG. 2 is a block diagram illustrating an exemplary configuration of a MPEG decoding and decompression system incorporating down conversion.

FIG. 2 is a block diagram illustrating an exemplary configuration of a MPEG decoding and decompression system incorporating down conversion. This embodiment of a decoding and decompression system 200 includes a variable length decoder (VLD) 28, a run-length (R/L) decoder 30, an inverse quantizer 32, IDCT mismatch control 33, a controller 40, and a DCT coefficient processor 34. As shown in FIG. 2, the DCT coefficient processor 34 comprises a DCT domain filter 36, and an inverse discrete cosine transform (IDCT) processor 38. In an alternate embodiment of a decoding and decompression system without down conversion, the DCT coefficient processor comprises only the IDCT processor. Note that, for completeness, FIG. 2 depicts the primary components of a MPEG decoding system incorporating down conversion. A more detailed description of this decoding processor may be found in pending U.S. patent application No. 09/169,790.

The digital television system may receive either high-definition television (HDTV) signals, that need to be filtered and downsampled before they can be displayed on the viewer's standard definition television (SDTV) monitor, or SDTV signals that may be displayed on the SDTV monitor. Controller 40 determines whether the DCT coefficients are to be downsampled and generates a control signal 62. Control signal 62 is provided to switches 41 and 45, and to the DCT coefficient processor 34. For example, when an HDTV signal is received, controller 40 provides control signal 62 such that switch 41 is open and switch 45 provides upsampled data to the half pixel generator (i.e., switch 45 is in the up position in FIG. 2). Control signal 62 is also provided to the DCT coefficient processor 34 such that the DCT coefficients of each block are lowpass filtered in the DCT domain during HDTV reception, before conversion to the spatial domain.

When SDTV signals are received, no down conversion or filtering is needed as these signals may be decoded and displayed on the SDTV monitor. In this instance, the controller 40 provides control signal 62 such that switch 41 is closed and switch 45 provides motion block data to the half pixel generator (i.e., switch 45 is in the lower position in FIG. 2), thus bypassing the downsampling and upsampling operations. The controller 40 also controls the DCT coefficient processor 34 to bypass the DCT domain filter when decoding the SDTV signals.

Processor 34 may also monitor the IDCT mismatch control processor 33 to determine which blocks of DCT coefficients are modified by the processor 33 and which blocks are not modified. The processor 34 then uses this information to control the value of the highest frequency filter coefficient of the DCT domain filter 36, as described below. According to this alternate embodiment of the invention, the highest frequency filter coefficient of the DCT domain filter 36 is set to unity only when the filter 36 is processing a block that was modified by the mismatch control processor 33. As a further refinement of this embodiment, the highest frequency filter coefficient of the DCT domain filter may be set to unity only when processing the row of coefficients in the modified block that includes the modified coefficient value F(M,N).

In operation, the encoded bit-stream is received and decoded by VLD 28. In addition to header information used by digital television system, the VLD 28 provides run length encoded DCT coefficients for each block and macroblock, and motion vector information. The DCT coefficients are run length decoded in the R/L decoder 30 and inverse quantized by the inverse quantizer 32.

The inverse quantizer 32 provides the DCT coefficients to the IDCT mismatch controller 33. The IDCT mismatch controller 33 provides DCT coefficients to the DCT filter 36 which may perform a lowpass filtering in the frequency domain by weighting the DCT coefficients with predetermined filter coefficient values before providing them to the IDCT processor 38. The IDCT processor 38 converts the filtered DCT coefficients into spatial pixel values by performing an inverse discrete cosine transform operation. MPEG does not specify the detail of the IDCT implementation. Therefore, forms of implementation can differ. This difference is most likely to become manifest when the values of the IDCT results are close to a half integer (e.g., 1.5). When the IDCT results are rounded to the nearest integer, it is possible that one implementation will round up, because its resultant value is only slightly greater than the value of the half integer, while the other will round down, because its resultant value is only slightly less than the value of the half integer. This mismatch becomes bigger when there are more prediction frames. To reduce the mismatch, MPEG employs IDCT mismatch control. Thus it is desirable to reduce the possible occurrence of half integer resultant values.

Figure 3:
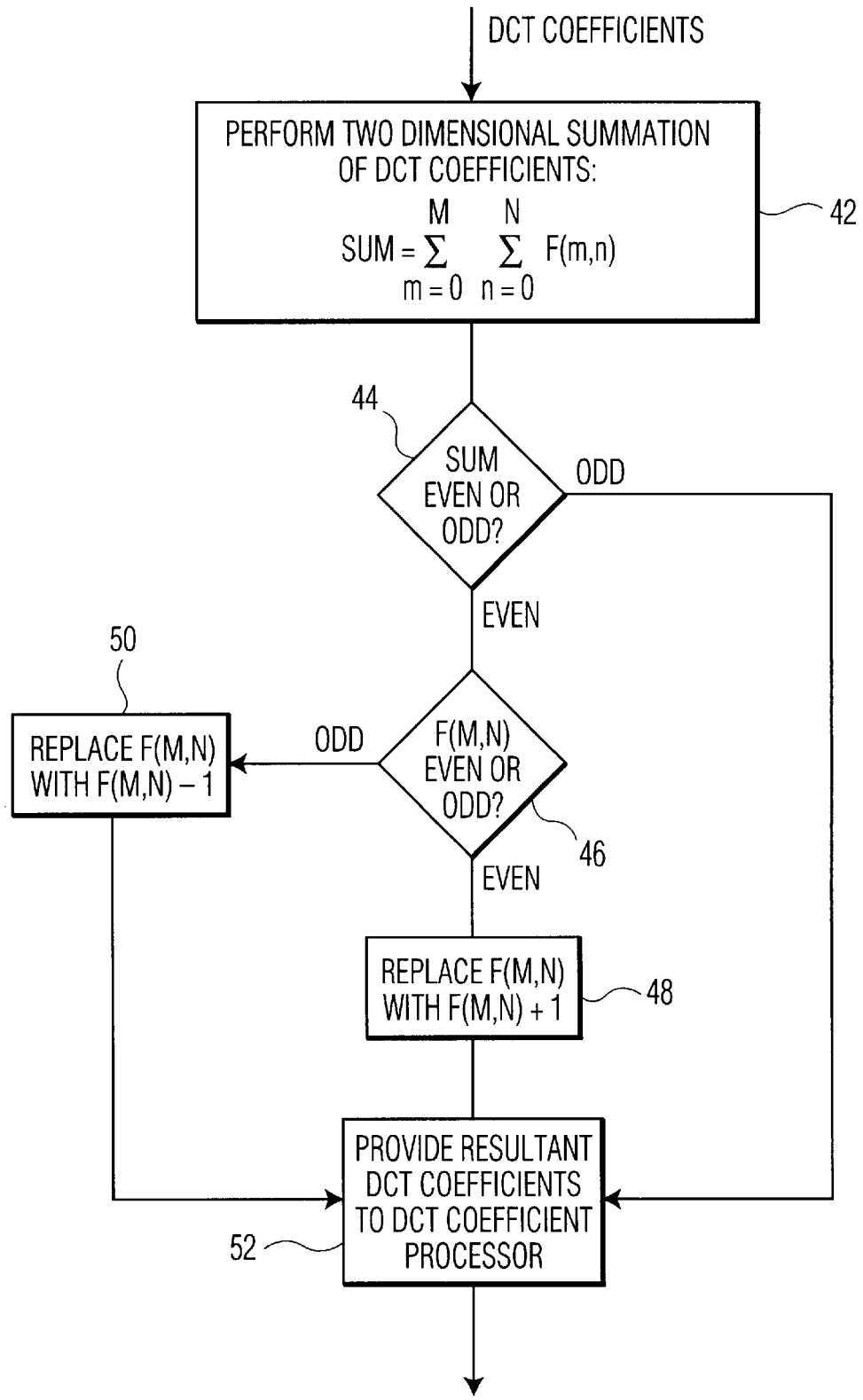
FIG. 3 is a flow diagram illustrating an exemplary IDCT mismatch control process in MPEG.

FIG. 3 is a flow diagram illustrating an exemplary IDCT mismatch control process in MPEG. DCT coefficients as provided by the inverse quantizer 32 are subjected to a summation process in step 42. This summation process is typically performed on a block of 8×8 DCT coefficients. The summation process in step 42 is in accordance with the following formula.

$$\text{Sum} = \sum_{m=0}^{M} \sum_{n=0}^{N} F(m, n)$$

F(m,n) represents a two dimensional matrix of DCT coefficients located by indices m and n. M is the highest value of the index m, and N is the highest value of the index n. At step 44, it is determined if the value produced by the summation process of step 42 is even or odd. If the summation value is odd, the DCT coefficients are provided to the DCT coefficient processor 34 as provided by the inverse quantizer 32. If, however, the value of the summation is even, then at step 46 it is determined if the value of a particular coefficient, F(M,N) is even or odd. If F(M,N) is even, the value of F(M,N) is replaced with the value {F(M,N)+1} at step 48. Then the DCT coefficients with the replacement value are provided, at step 52, to the DCT coefficient processor 34. If the value of F(M,N) is odd, the value of F(M,N) is replaced with the value {F(M,N)−1} at step 50. This is equivalent to toggling the least significant bit (LSB) of the coefficient F(M,N). Then the DCT coefficients with the replacement value are provided to the DCT coefficient processor 34.

When down conversion is performed, the exemplary embodiment of the DCT coefficient processor 34 as depicted in FIG. 2 comprises a DCT domain filter 36 and an IDCT processor 38. The derivation and advantages of using the DCT domain filter are described in an application for patent, DOWN CONVERSION SYSTEM USING A PRE-DECIMATION FILTER, Ser. No. 09/169,790. Briefly, the DCT domain filter 36, which processes the DCT coefficients in the frequency domain, is an alternative to implementing a lowpass filter in the spatial domain. For example, lowpass filtering in the spatial domain is accomplished in the frequency domain by multiplying the DCT coefficients by weighting coefficients prior to performing the IDCT process. In a mathematical illustration, spatial values, x(n), can be obtained by the IDCT process described by the following equation:

$$x(n) = \frac{1}{N} \sum_{k=0}^{N-1} \alpha(k) \cdot C(k) \cdot \cos\frac{\pi k(n + 1/2)}{N},$$

where $\alpha(k) = \frac{1}{2}$ for k=0 and 1 otherwise.

Here a one dimensional DCT is illustrated for simplicity. The weighting coefficients, used to accomplish lowpass filtering, are obtained by transforming the lowpass filter impulse response in the spatial domain to weighting coefficients in the frequency domain. These weighting coefficients are represented by H'(k) in the following equation:

$$y(n) = \frac{1}{N} \sum_{k=0}^{N-1} \alpha(k) \cdot \{C(k) \cdot H'(k)\} \cdot \cos\frac{\pi k(n+1/2)}{N},$$

where y(n) represents the spatial values resulting from performance of the IDCT process on the DCT coefficients multiplied by H'(k).

One purpose of the filter is to reduce the visibility of block boundaries.

If the filter is simply applied to a block of spatial pixel values, there is a transition of filtering on the block boundary, which is caused by an insufficient number spatial pixel values beyond the boundary to fill the residual of the filter. That is to say, coefficient values at the edge of a block cannot be properly filtered because an N-tap filter has values for only N/2 taps, the remaining values are beyond the boundary of the block. One method of supplying pixel values is to mirror the pixel values of the block to form vertical previous and subsequent blocks of pixel values adjacent to the processed block. The filter applied in this way is termed a "block mirror filter."

The following describes a horizontal block mirror filter that lowpass filters 8 input spatial pixel values of a block. If the size of the input block is an 8×8 block matrix of pixel values, then a horizontal filtering can be done by applying the block mirror filter to each row of 8 pixel values. The filtering process can be implemented by applying the filter coefficients columnwise of the block matrix, or multidimensional filtering may be accomplished by filtering of the rows and then filtering the columns of the block matrix.

Figure 4:
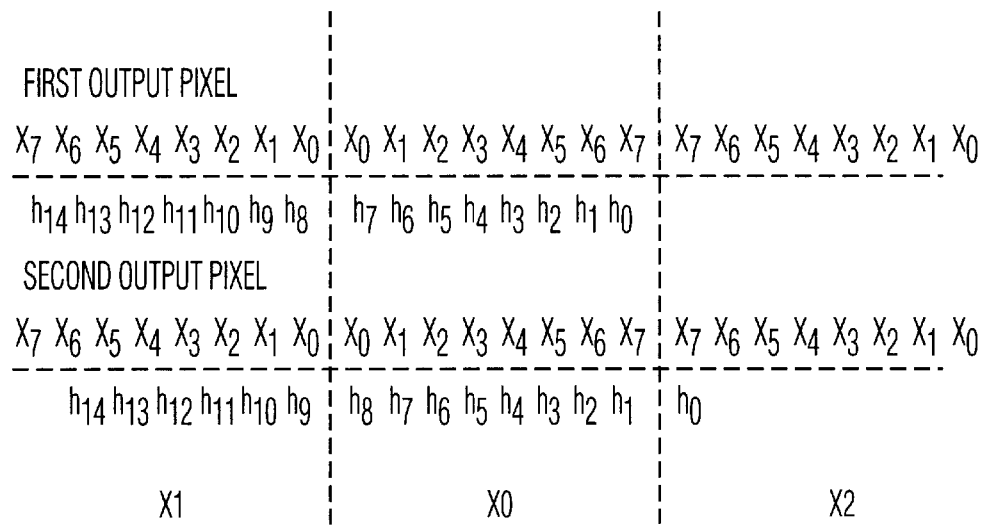
FIG. 4 (prior art) illustrates the multiplication pairs for the first and second output pixel values of a block mirror filter.

FIG. 4 (prior art) shows the correspondence between the input pixel values $x_0$ through $x_7$ (group X0) for a mirror filter for 8 input pixels which employs a 15 tap spatial filter represented by tap values $h_0$ through $h_{14}$. The input pixels are mirrored on the left side of group X0, shown as group X1, and on the right side of group X0, shown as group X2. The output pixel value of the filter is the sum of 15 multiplications of the filter tap values with the corresponding pixel values. FIG. 4 illustrates the multiplication pairs for the first and second output pixel values.

Figure 5:
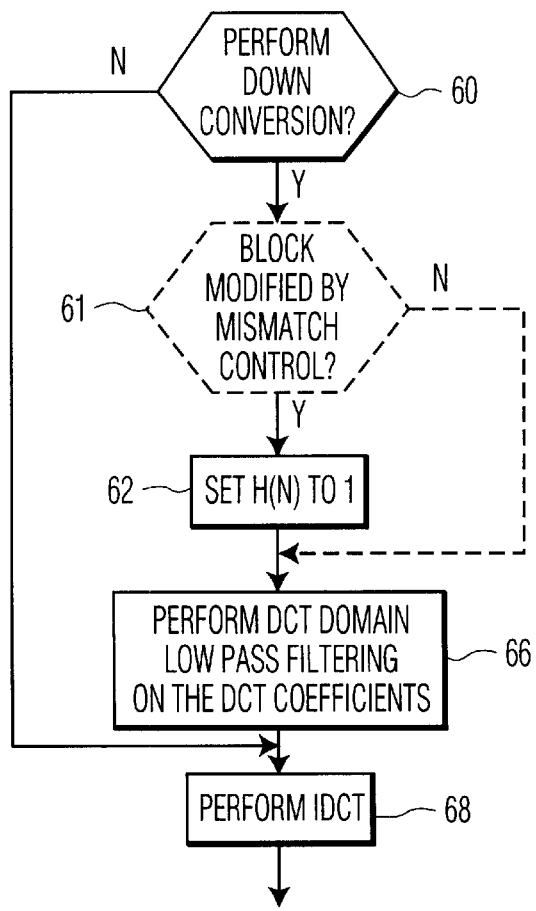
FIG. 5 is a flow diagram of an exemplary embodiment of a DCT lowpass filter in accordance with the invention.

FIG. 5 is a flow diagram of an exemplary embodiment of a DCT lowpass filter in accordance with the invention. In step 60, it is determined if down conversion is to be performed. If down conversion is to be performed, the value of the weight (i.e., filter coefficient) of the DCT domain lowpass filter corresponding to the highest DCT component, depicted as H(N) in FIG. 5, is replaced with 1, in step 62. If down conversion is not to be performed, the DCT domain lowpass filter is bypassed (not used). DCT domain lowpass filtering is performed on the resultant DCT coefficients provided by the IDCT mismatch controller, using the appropriate value of H(N) in step 66. The lowpass filtered data provided by step 66 is inverse discrete cosine transformed in step 68. FIG. 5 includes an alternate step 61 shown in phantom. This step is executed if it is determined at step 60 that downconversion is to be performed. Step 61 determines if the particular block of DCT coefficient values that is currently being processed was modified by the IDCT mismatch processor. If it was, then step 62, described above, is executed after step 61. If, however, the block was not modified by the mismatch processor, then step 62 is skipped and the unmodified DCT domain filter coefficients are used by the filtering step 66.

For simplicity, a one dimensional case is illustrated, but it can be extended to two dimensional cases by applying the DCT filter horizontally and vertically separately. Two exemplary implementations of the 8 point DCT domain filters are as follows.

| 3:1 Horizontal Down Conversion | |
|---|---|
| H[0] | 1.0 |
| H[1] | 0.986934590759779 |
| H[2] | 0.790833583171840 |
| H[3] | 0.334720213357461 |
| H[4] | −0.0323463361027473 |
| H[5] | −0.0377450036954524 |
| H[6] | −0.0726889747390758 |
| H[7] | 0.00954287167337307 |

| 2:1 Horizontal Down Conversion | |
|---|---|
| H[0] | 1.0 |
| H[1] | 1.0 |
| H[2] | 1.0 |
| H[3] | 0.82247656390475166 |
| H[4] | 0.467282348620006007 |
| H[5] | 0.10634261847436199 |
| H[6] | −0.52131780559049545 |
| H[7] | −0.003489737967467715 |

As seen above, the weightings gradually decrease as the frequency becomes larger, which is typical for a lowpass filtering process. In the highest frequency, the weight is close to zero. Thus if the highest DCT coefficient is previously altered by the IDCT mismatch control, the DCT domain filter negates this change. This causes an undesirable effect, especially on a flat background with several prediction frames. Because the IDCT mismatch accumulates with each prediction, the annoying result is that the desired flat background appears to be changing, temporally, as the picture progresses.

In an exemplary embodiment of the invention, during down conversion, all DCT domain filter weights remain unchanged except for the weight corresponding to the highest DCT frequency. One reason for doing this is to minimize the effect on IDCT mismatch control. In other words the highest DCT weighting is one instead of zero. For example, the above DCT domain filter weights are changed to:

| DCT Domain Filter Weights for 3:1 Horizontal Down Conversion in Accordance with an Exemplary Embodiment of the Invention | |
|---|---|
| H[0] | 1.0 |
| H[1] | 0.986934590759779 |
| H[2] | 0.790833583171840 |
| H[3] | 0.334720213357461 |
| H[4] | −0.0323463361027473 |
| H[5] | −0.0377450036954524 |
| H[6] | −0.0726889747390758 |
| H[7] | 1.0 |

DCT Domain Filter Weights for 2:1 Horizontal Down Conversion in Accordance with an Exemplary Embodiment of the Invention

| H[0] | 1.0 |
|------|-----|
| H[1] | 1.0 |
| H[2] | 1.0 |
| H[3] | 0.82247656390475166 |
| H[4] | 0.46728234862006007 |
| H[5] | 0.10634261847436199 |
| H[6] | −0.52131780559049545 |
| H[7] | 1.0 |

During down conversion, the DCT lowpass filter is used to prevent aliasing distortion in the downsampled image. Because alteration of the DCT filter weights changes the frequency response of the filter, the prevention of aliasing may be affected. Because bypassing the highest frequency DCT filter component is likely to have little effect on the anti-aliasing capability of the DCT filter, any aliasing due to this bypassing is most likely less severe than the effects of IDCT mismatch. To date, modifying the DCT lowpass filter weights as depicted in the above tables has resulted in no visible aliasing.

The present invention may be implemented in software for a general-purpose computer. As such, the software may be embodied in a machine-readable carrier, such as a disk, diskette, CD-ROM, DVD ROM, or radio frequency or audio frequency carrier wave.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. Apparatus, for use in a video decoder which decodes digital video signals that have been encoded into blocks of frequency domain coefficient values, to compensate for inverse transform mismatch errors which occur during conversion of a first resolution encoded video signal to a second resolution encoded video signal, wherein the second resolution is lower than the first resolution, the apparatus comprising:

a mismatch control processor coupled to receive the blocks of frequency domain coefficient values and to process the blocks of frequency domain coefficient values according to a mismatch control algorithm to produce respective blocks of processed frequency domain coefficient values;

a frequency domain filter having a plurality of frequency domain filter coefficients corresponding to a respective plurality of frequency bands, the frequency domain filter being coupled to receive the blocks of processed frequency domain coefficient values, for filtering the blocks of processed frequency domain coefficient values to provide respective blocks of low-pass filtered frequency domain coefficient values, wherein one of said frequency domain filter coefficients corresponding to a highest frequency band is set to 1; and an inverse frequency domain transform processor coupled to the frequency domain filter for transforming the blocks of low-pass filtered frequency domain coefficient values into spatial domain picture elements.

2. Apparatus according to claim 1, wherein:

the mismatch control processor changes only some of the blocks of frequency domain coefficient values such that the respective blocks of processed frequency domain coefficient values include both changed and unchanged blocks;

the frequency domain filter is responsive to a control signal to selectively change the frequency domain filter coefficient corresponding to the highest frequency band to 1, and the apparatus further includes a controller which generates the control signal for the frequency domain filter indicating that the block of processed frequency domain coefficient values currently being processed by the frequency domain filter was changed by the mismatch control processor.

3. Apparatus according to claim 1 wherein the video decoder conforms to a standard of the Moving Picture Experts Group (MPEG), the frequency domain coefficient values are discrete cosine transform (DCT) coefficient values, and the inverse frequency domain transform processor is an inverse discrete cosine transform (IDCT).

4. Apparatus according to claim 1 wherein the mismatch control algorithm is in accordance with a formula:

$$\text{sum} = \sum_{m=0}^{M} \sum_{n=0}^{N} F(m,n),$$

F*(m,n)=F(m,n) for all values of m and n except m=M and n=N,

F*(M,N)=F(N,M)+1, if sum is an even value and F(N,M) is an even value,

F*(M,N)=F(N,M)−1, if sum is an even value and F(N,M) is an odd value, wherein

F(m,n) is a two dimensional matrix of discrete cosine transform (DCT) coefficients located by indices m and n, F*(m,n) is a two dimensional matrix of DCT coefficients resulting from the application of the mismatch control algorithm to F(m,n), M is a highest value of the index m; and N is a highest value of the index n.

5. Apparatus according to claim 1 wherein, the frequency domain filter is an anti aliasing filter for a 2 to 1 down conversion system having frequency domain filter coefficients approximately equal to:

H[0]=1.0,
H[1]=1.0,
H[2]=1.0,
H[3]=0.82,
H[4]=0.47,
H[5]=0.11,
H[6]=−0.52,
H[7]=1.0.

6. Apparatus according to claim 1 wherein, the frequency domain filter is an anti aliasing filter for a 3 to 1 down conversion system having frequency domain filter coefficients approximately equal to:

H[0]=1.0,
H[1]=0.99,
H[2]=0.79,
H[3]=0.33,

H[4]=−0.03,
H[5]=−0.04,
H[6]=−0.07,
H[7]=1.0.

7. A method for use in a video decoder which decodes video signals conforming to a standard of the Moving Picture Experts Group (MPEG) to compensate for inverse transform mismatch errors which occur during conversion of a first resolution encoded video signal to a second resolution encoded video signal, wherein the second resolution is lower than the first resolution, said method comprising the steps of:

decoding an MPEG encoded bitstream to produce a plurality of blocks of quantized frequency domain coefficients, inversely quantizing the blocks of quantized frequency domain coefficients to produce respective blocks of inverse quantized frequency domain coefficients, compensating the blocks of inverse quantized frequency domain coefficients for inverse transform mismatch errors to produce respective blocks of compensated inverse quantized frequency domain coefficients;

filtering, with filter coefficients corresponding to respective frequency bands, the blocks of compensated inverse quantized frequency domain coefficients to produce respective blocks of low-pass filtered inverse quantized frequency domain coefficients, wherein; one of said filter coefficients corresponding to a highest frequency band is set to 1; and transforming the blocks of low-pass filtered inverse quantized frequency domain coefficients to provide temporal domain image picture element values.

8. A method according to claim 7, wherein:

the step of compensating the inverse quantized frequency domain coefficients for inverse transform mismatch errors changes only some of the blocks of frequency domain coefficient values such that the respective blocks of compenated frequency domain coefficient values include both changed and unchanged blocks;

the step of filtering the blocks of compensated frequency domain coefficients sets the filter coefficient corresponding to the highest frequency band to 1 only when filtering the changed blocks of compensated frequency domain coefficient values.

9. The method according to claim 7 wherein the step of compensating is accordance with a formula:

$$\text{sum} = \sum_{m=0}^{M} \sum_{n=0}^{N} F(m, n),$$

F*(m,n)=F(m,n) for all values of m and n except m=M and n=N,

F*(M,N)=F(N,M)+1, if sum is an even value and F(N,M) is an even value,

F*(M,N)=F(N,M)−1, if sum is an even value and F(N,M) is an odd value, wherein

F(m,n) is a two dimensional matrix of discrete cosine transform (DCT) coefficients located by indices m and n, F*(m,n) is a two dimensional matrix of DCT coefficients resulting from the application of the mismatch control algorithm to F(m,n), M is a highest value of the index m; and N is a highest value of the index n.

10. Apparatus for use in a video decoder which decodes video signals conforming to a standard of the Moving Picture Experts Group (MPEG), to compensate for mismatch compensation correction errors which occur during conversion of a first resolution encoded video signal to a second resolution encoded video signal, wherein the second resolution is lower than the first resolution, comprising:

means for decoding an MPEG encoded bitstream to produce quantized discrete cosine transform coefficients;

means for inversely quantizing the quantized discrete cosine transform coefficients to produce inverse quantized discrete cosine transform coefficients;

means for compensating the inverse quantized frequency domain coefficients for inverse transform mismatch errors to produce compensated inverse quantized frequency domain coefficients;

means for filtering with filter coefficients corresponding to respective frequency bands, the compensated inverse quantized frequency domain coefficients to produce low-pass filtered inverse quantized frequency domain coefficients, wherein; one of said filter coefficients corresponding to a highest frequency band is set to 1; and means for transforming the low-pass filtered inverse quantized frequency domain coefficients to provide temporal domain image picture element values.

11. Apparatus according to claim 10 wherein the transforming means is a discrete cosine transform processor.

12. A computer program product comprising a computer usable carrier having computer readable program code embodied therein for causing a computer to decode a video signal conforming to a standard of the Moving Picture Experts Group (MPEG), the computer program causing the computer to compensate for mismatch compensation correction errors which occur during conversion of a first resolution encoded video signal to a second resolution encoded video signal, wherein the second resolution is lower than the first resolution, by causing the computer to perform the steps of:

decoding an MPEG encoded bitstream to produce a plurality of blocks of quantized frequency domain coefficients, inversely quantizing the blocks of quantized frequency domain coefficients to produce respective blocks of inverse quantized frequency domain coefficients, compensating the blocks of inverse quantized frequency domain coefficients for inverse transform mismatch errors to produce respective blocks of compensated inverse quantized frequency domain coefficients;

filtering, with filter coefficients corresponding to respective frequency bands, the blocks of compensated inverse quantized frequency domain coefficients to produce respective blocks of low-pass filtered inverse quantized frequency domain coefficients, wherein; one of said filter coefficients corresponding to a highest frequency band is set to 1; and transforming the blocks of low-pass filtered inverse quantized frequency domain coefficients to provide temporal domain image picture element values.

13. A computer program product according to claim 12, wherein:

the computer readable program code that causes the computer to compensate the inverse quantized frequency domain coefficients for inverse transform mismatch errors changes only some of the blocks of frequency domain coefficient values such that the respective blocks of compensated frequency domain coefficient values include both changed and unchanged blocks; and the computer readable program code that causes the computer to filter the blocks of compensated frequency domain coefficients causes the computer to set the filter coefficient corresponding to the highest frequency band to 1 only when filtering the changed blocks of compensated frequency domain coefficient values.

* * * * *